United States Patent [19]
Sciammarella et al.

[11] Patent Number: 5,912,668
[45] Date of Patent: Jun. 15, 1999

[54] CONTROLLING A SCREEN DISPLAY OF A GROUP OF IMAGES REPRESENTED BY A GRAPHICAL OBJECT

[75] Inventors: Eduardo Sciammarella; Andrew Proehl, both of New York, N.Y.

[73] Assignees: Sony Corporation, Tokyo, Japan; Sony Electronics, Inc., Park Ridge, N.J.

[21] Appl. No.: 08/865,947

[22] Filed: May 30, 1997

[51] Int. Cl.⁶ .................................................. G06F 3/14
[52] U.S. Cl. ........................... 345/348; 345/352; 345/340
[58] Field of Search .................................. 345/352, 348, 345/349, 347, 326–346, 350–351, 133, 340

[56] References Cited

U.S. PATENT DOCUMENTS

| | | | |
|---|---|---|---|
| 4,900,695 | 2/1990 | Takahashi et al. | 437/195 |
| 5,028,780 | 7/1991 | Kaito et al. | 250/307 |
| 5,317,687 | 5/1994 | Torres | 345/352 |
| 5,416,901 | 5/1995 | Torres | 345/348 |
| 5,428,729 | 6/1995 | Chang et al. | 345/339 |
| 5,479,601 | 12/1995 | Mathony et al. | 345/340 |
| 5,491,783 | 2/1996 | Douglas | 345/340 |
| 5,506,952 | 4/1996 | Choy et al. | 345/340 |
| 5,550,969 | 8/1996 | Torres et al. | 345/348 |
| 5,583,344 | 12/1996 | Mizumura et al. | 250/492.21 |
| 5,680,563 | 10/1997 | Edelman | 345/348 |
| 5,801,699 | 9/1998 | Hocker et al. | 345/348 |

*Primary Examiner*—Steven P. Sax
*Attorney, Agent, or Firm*—Frommer Lawrence & Haug, LLP; William S. Frommer

[57] ABSTRACT

The display of images collectively represented by a graphical object, referred to as an anchor, is controlled on a screen via input means. As the user manipulates the anchor on the screen, the display of images is modified in correspondence with the object manipulation. The images are subjected to various functions as a group: for example, in response to a movement of the anchor on the screen, the images are also moved while being completely hidden from view. Other functions include fully displaying, sorting and re-arranging the group configuration of the images. To carry out these functions, menu items zoom into view on the screen in response to an anchor manipulation by the user.

22 Claims, 6 Drawing Sheets

CONTROLLING A SCREEN DISPLAY OF A GROUP OF IMAGES REPRESENTED BY A GRAPHICAL OBJECT

BACKGROUND OF THE INVENTION

The present invention is related to a Graphical User Interface (GUI) and, in particular, an apparatus and method for interactively and visually controlling on a screen the display of images forming a group represented by a graphical object by manipulating that graphical object on the screen via an input device.

As well known in the art, a Graphical User Interface allows a user of a computer system to view, manipulate, etc. images on a screen in a simple and user-friendly manner. The displayed images may be graphical or textual. As the complexity and functionality of computer systems increase, however, the limited display area of the computer screen becomes a highly valuable "commodity." Clearly, the display area must be utilized wisely to accommodate the increased system complexity, as correctly pointed out in the U.S. Pat. No. 5,341,466 to Perlin et al, for example.

OBJECTS OF THE INVENTION

It is an object of the present invention to control a group of images represented by a graphical object on a screen.

It is another object of the present invention to perform various operations on all images within a group by manipulating a single graphical object representing that group of images.

It is a further object of the present invention to hide all images within a group by collapsing them into a graphical object representing that group for ease of manipulation.

It is still another object of the present invention to arrange in various configurations the display of a group of images represented by a graphical object.

SUMMARY OF THE INVENTION

These and other objects, features and advantages are accomplished by a system and method for controlling via input means a display of a group of images represented by a graphical object. The graphical object is selected on the screen display via the input means. The selected graphical object is manipulated such that the display of the group of images is modified in correspondence with the manipulation of the selected graphical object.

In accordance with one aspect of the present invention, a menu is displayed on the screen in response to the manipulation of the graphical object. The menu has multiple items for performing various operations on the group of images collectively and on each image in the group individually.

In accordance with another aspect of the present invention, one of the menu items includes removing the menu from the screen. Another of the menu items includes fully displaying each image in the group in a predetermined group configuration, wherein the graphical object is connected to the group via at least one fully displayed image. Yet another of the menu items includes removing each fully displayed image while leaving the graphical object displayed on the screen. Still another of the menu items includes changing the predetermined group configuration of the fully displayed images on the screen to another predetermined configuration.

In accordance with still another aspect of the present invention, arranging the displayed images in the predetermined configuration includes varying the size of each displayed image based on a temporal order and sorting the displayed images according to the size of each displayed image on the screen display.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

The present invention will now be explained in detail with reference to the accompanying drawings.

Figure 1A:
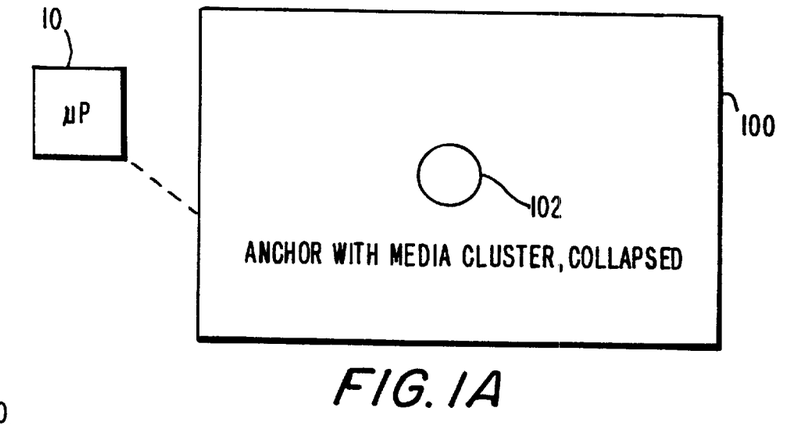
FIG. 1A is a screen display of a graphical object, i.e., anchor, representing a group of images, which are collapsed into the anchor, in accordance with the present invention.

FIG. 1A shows screen display 100 of a computer system controlled by a microprocessor 10 having an input device (not shown), such as a mouse, lightpen or keyboard to manipulate objects on the screen of a monitor, etc. of the computer system. As illustrated in FIG. 1A, graphical object 102 is displayed on the screen display 100. Hereinbelow, the graphical object 102 is referred to as an anchor whose function is to collectively represent elements, such as graphical images, within a group. This representation is manifested via some form of a visual connection, e.g., a straight line, as will be explained more fully below. While the anchor on the screen is shown in the shape of a sphere or circle, it is understood that the anchor may take on other shapes and configurations suitable for display.

The anchor 102 in FIG. 1A is shown with its media cluster, i.e., images, etc., collapsed. That is, only the anchor 102 is visible to the user. The anchor may have a label displayed thereon identifying the anchor and its associated media cluster to the user. Alternatively, the shape or color of the anchor may serve as the identification for the entire group.

Figure 1B:
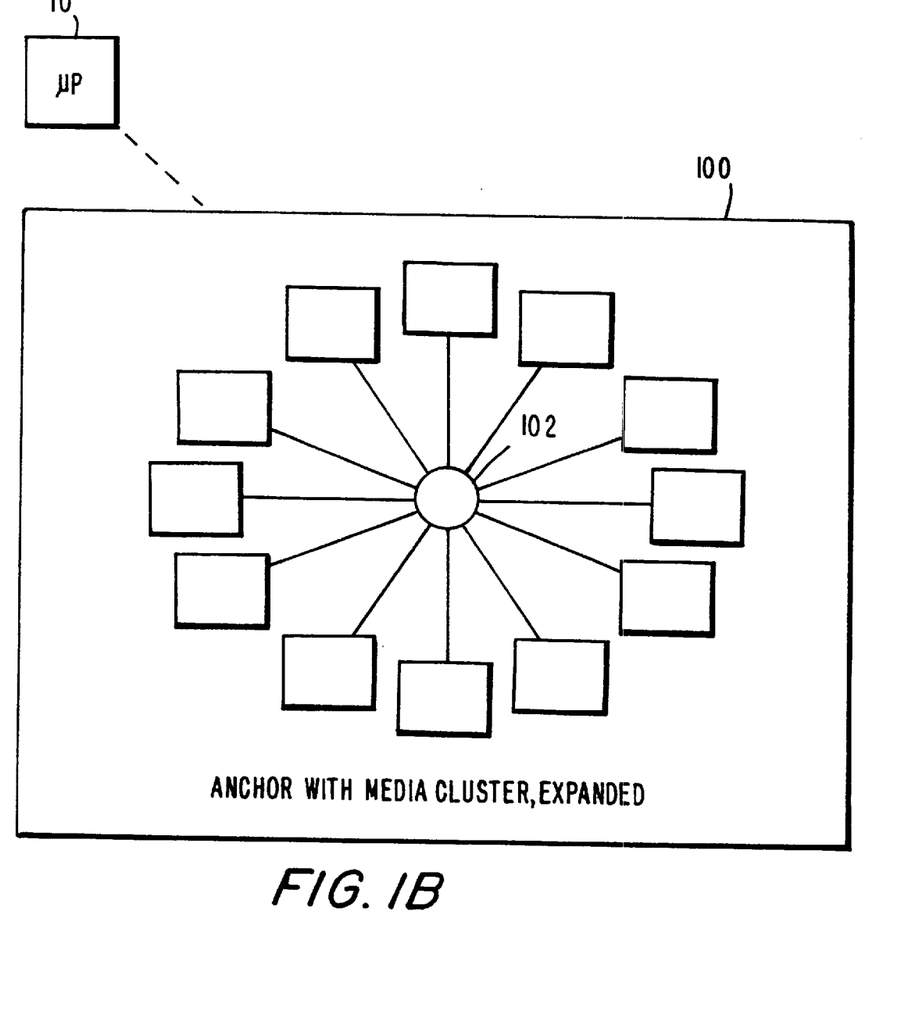
FIG. 1B is a screen display of the same anchor as in FIG. 1A, wherein the group of images is expanded due to user manipulation of the anchor.

FIG. 1B illustrates the anchor 102 with its media cluster expanded. Under the user control, either by merely pointing to the anchor or pointing and selecting the anchor via an input device, images within the group represented by the anchor appear on the screen, all "anchored" to the graphical object 102. Preferably, the images within the group are related to each other by content forming a content-related structure, such that an anchor may be associated with a particular media cluster.

This selective expansion of the media cluster—as shown in FIGS. 1A and 1B—is initiated by the user manipulation of the graphical device 102 if the contents of each image, for example, are to be currently viewed on the screen. Prior to this operation, however, a group of images, while hidden from view as shown in FIG. 1A, is collectively represented by the anchor such that all operations performed on that anchor apply to all of the images within the group.

Namely, if the images are to be moved, for example, to a different location on the screen, moving each image individually or moving all of them at the same time is a cumbersome and complex operation, especially if the screen is densely populated with other images which are not to be relocated. According to one aspect of the present invention, the "move" function is performed as follows: the images belonging to a particular anchor are folded, i.e., collapsed, the anchor is moved to a desired location, and the images are then expanded in the desired location on the screen. Clearly, the graphical object 102 provides means to act on the entire group as a single element without cluttering the screen during the intermediate steps of the operation.

Only the anchor may be visible on the screen by collapsing the group images into the anchor until the user is ready to perform some operation on individual image content within the group. This ability not to display each individual group member, while remaining "anchored" to a single graphical object, is advantageous for not wasting a substantial display area on the screen. As stated previously, the anchor may be labeled or otherwise identified for easy association with a particular media cluster.

Figure 2A:
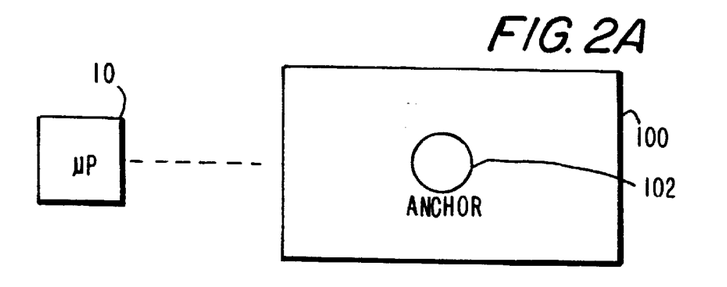
FIG. 2A is a screen display of an anchor with images collapsed into the anchor.
Figure 2B:
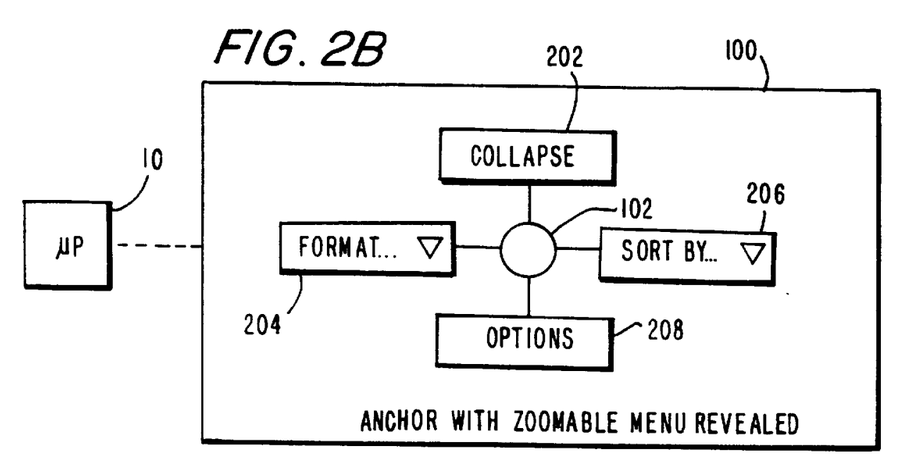
FIG. 2B is a screen display of the anchor having zooming to menus revealed due to user manipulation.
Figure 2C:
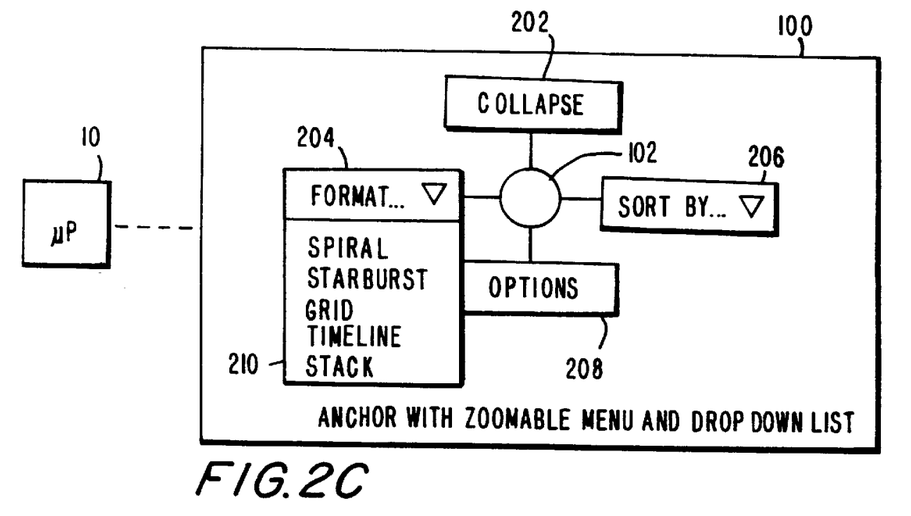
FIG. 2C is a screen display of a drop-down list for a zooming menu presenting various functions operable on the group of images represented by the anchor.

FIGS. 2A–2C show several representative illustrations of various operations performed on the anchor and its corresponding media cluster using zooming menus. In FIG. 2A, the anchor 102 is shown in its collapsed state on the screen 100. Let it be assumed that the user manipulates the input device (not shown) so that a menu "zooms out" (appears) on the screen as shown in FIG. 2B. As an example, the user manipulation may include placing a cursor on the anchor and activating (clicking) a particular button on the mouse, etc.

The representative menu in FIG. 2B has the following items: "Collapse" 202, "Format . . . " 204, "Sort by . . . " 206 and "Options" 208. By selecting a particular item on the menu, a function corresponding to the selected item is carried out. For example, if the "Collapse" operation is chosen, the display of the images returns to their "collapsed" state of FIG. 2A.

Certain menu items have additional sub-menu items, illustratively indicated as drop-down lists, which are displayed when that menu item is selected by the user. As shown in FIG. 2C, "Format" . . . offers drop-down list 210 of various group configurations for displaying a group of images on the screen. The particular group configuration in FIG. 1B may be referred to as "Starburst" which is selectable by the user along with other representative configurations, i.e., formats.

Figure 3:
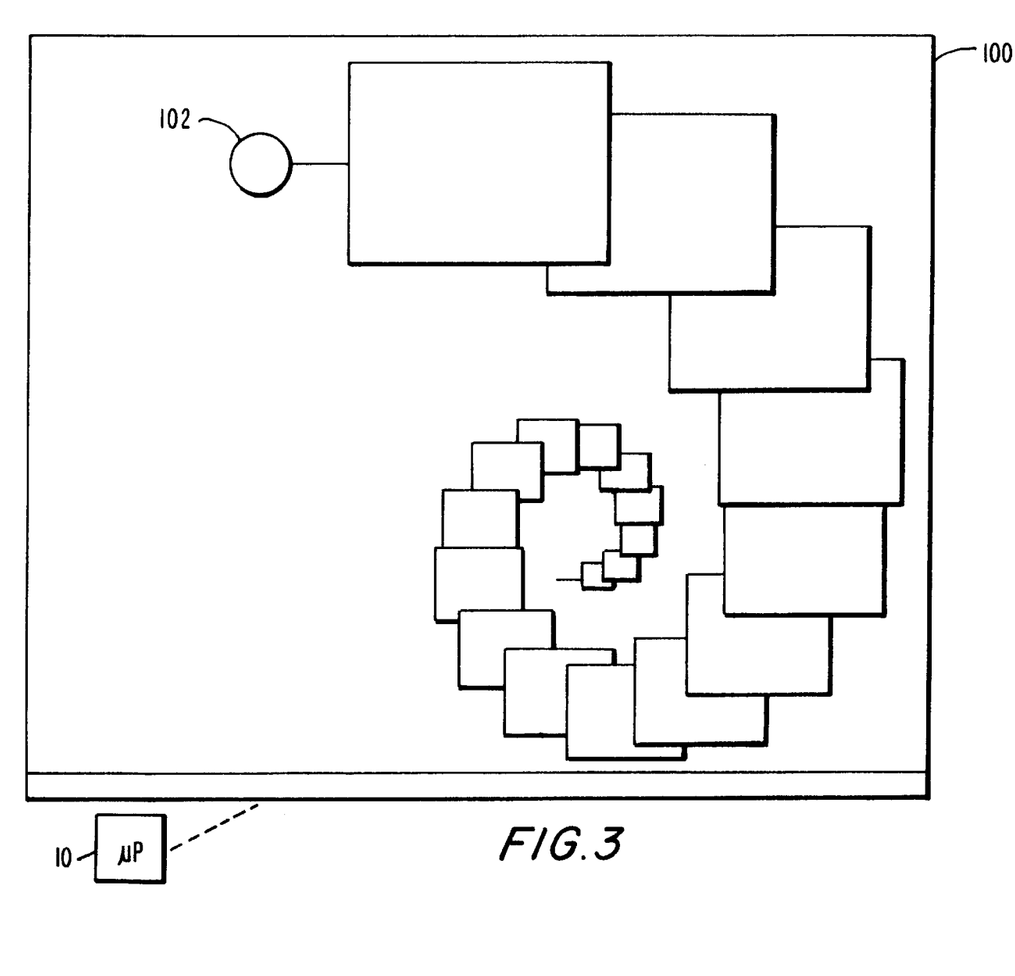
FIG. 3 is a screen display of a group of images held by an anchor arranged according to another group configuration in accordance with the present invention.

The arrangement of images within a group is freely selectable by the user via an option on the zooming menu, and the user may structure the display of images based on various criteria applicable to those images: functionality, currentness, aestheticism, etc. FIG. 3, for example, shows an arrangement of the graphical images on the screen known as spiral. In this arrangement, the first image being the largest is connected to the anchor 102 directly, while the remaining images, gradually diminishing in size, may be indirectly connected to the anchor via their overlapping image portions. It will be appreciated that while only one image is directly attached to the anchor in this particular arrangement, the remaining images within the group are also controlled by that anchor.

The spiral display may be arranged such that the most current image is the largest. This may include date and time of creation of a page in a document, for example, etc. That is, let it be assumed the user creates a multi-page document using word-processing software, for example, and then wishes to review all or several pages of that document on the screen. By selecting the anchor associated with the created document (FIG. 2A) and expanding the images using spiral configuration (FIG. 3), the pages of the document are displayed on the screen in various sizes according to the date and time of creation of each page. The more recent the page in the document, the larger it appears on the screen.

Alternatively, the images in the spiral display may be arranged according to the time the user retrieved them from a database or the Internet, for example. In particular, the user may obtain several textual images, i.e., documents, from a commercial on-line content provider and then several images from the Internet which are related to the retrieved text. When viewing all of the "downloaded" images related to the particular subject, for example, the images are arranged on the screen in the spiral configuration according to their retrieval, i.e., the graphical images may appear larger than the textual images since the graphical images were obtained later, i.e., they are more current, than the textual images. It is understood, of course, that the spiral display may be set up—using, for example, the "Sort by . . . " option in the zooming menu—to display images within a group tied to a particular anchor in a reverse order of currentness. A further description of the display shown in FIG. 3 is found in co-pending application Serial No. (attorney docket 450103-3809), incorporated herein by reference.

Figure 4:
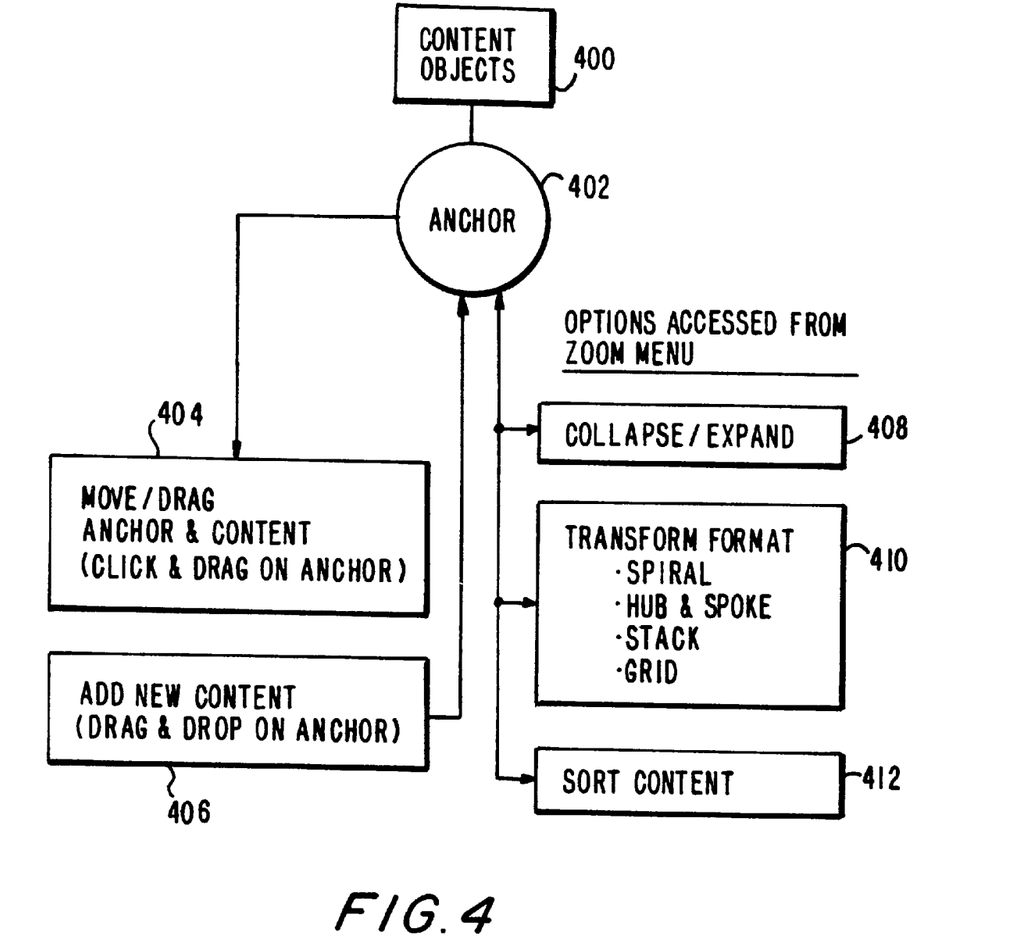
FIG. 4 is a functional diagram of the operation of the present invention.

FIG. 4 is a functional diagram of the operation of, for example, microprocessor 10 to effect the display of the present invention. Content objects, i.e., images, of step 400 are associated with anchor of step 402. The anchor may be subjected to various operations in step 404, such as "move/drag" which moves the anchor and its contents as long as the user "clicks and drags" a mouse (or the like) on the anchor. Further, new content may be added to the anchor via the "drag and drop on anchor" operation of step 406.

Further shown in FIG. 4 are functions that can be accessed from the zooming menu (FIG. 2B). These functions, which have been previously described, include "Collapse/Expand" in step 408, "Transform Format" in step 410 and "Sort Content" in step 412.

Another aspect of the present invention is illustrated in FIGS. 5A–5D and 6A–6D. In particular, FIGS. 5A–5D show an exemplary operation for creating the anchor 102, while FIGS. 6A–6D show how the anchor 102 is eliminated from the screen display 100.

Figure 5A:
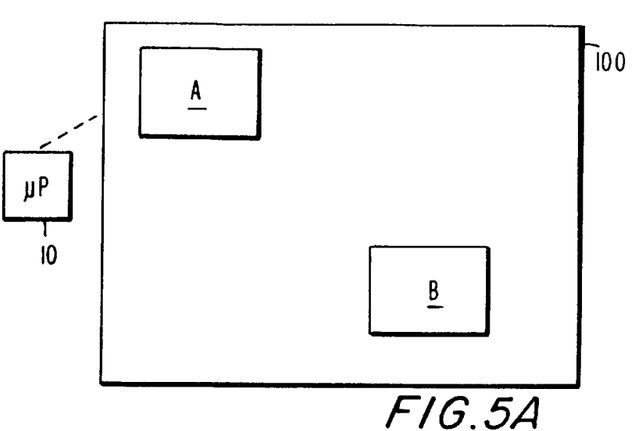
FIGS. 5A–5D show an exemplary operation for forming a group of images by creating the anchor 102.

Two representative images A, B are displayed on the screen display 100 in FIG. 5A. It is apparent from FIG. 5A that the images A, B are separated from each other by a particular distance. Next, via the input device, the user selects, for example, the image A and moves it ("drags")

toward the image B. This operation—accomplished, for example, by clicking the mouse on the image A and then dragging this image in the direction of the image B by pressing and keeping the mouse button down—is graphically illustrated in FIG. 5B. The arrow indicates the direction in which the image A is moved by the user via the input device.

Figure 5B:
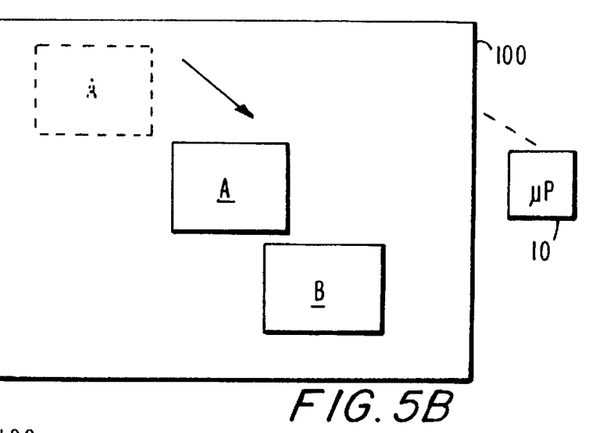
Figure 5C:
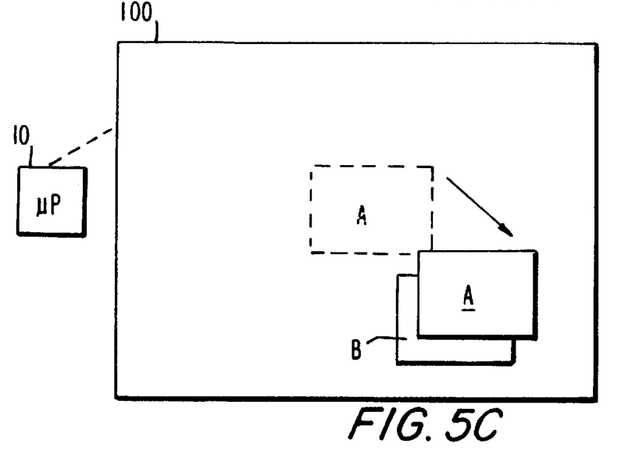
Figure 5D:
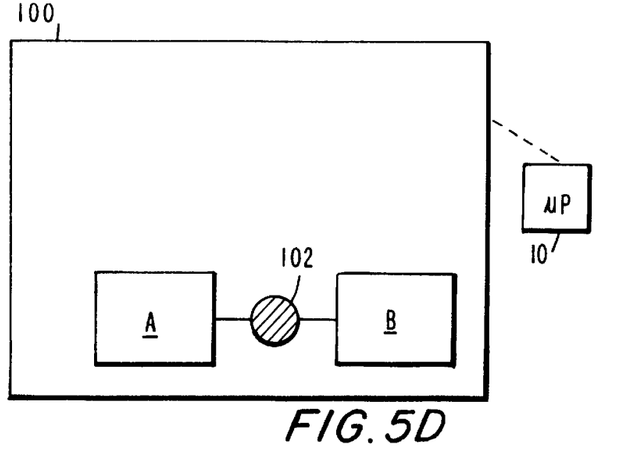

As show in FIG. 5C, the user continues dragging the image A in the direction of the arrow (towards the image B). At this point, the images A, B are partially overlapping each other. Due to this overlap, the images A, B form a group that is commonly represented by the anchor 102 which is created for this particular group, as illustrated in FIG. 5D. Namely, once the two images are spaced apart by a distance less than a preselected distance, an anchor for joining these images into a group appears on the display screen. The anchor may then be manipulated via the input means, whereby the display of this group of images is modified in correspondence with the anchor manipulation, as described above.

It is understood, of course, that while the above operation is illustratively shown with two images A, B), any number of images can be added to the group by moving a candidate image to the image A or image B, for example, under the user control. That is, by dragging the candidate image to any one of the images connected by the anchor, the candidate image is added to the group once the distance between the group image and the candidate image becomes less than the preselected distance.

It will be appreciated that the maximum separation distance between the images for effecting generation of the anchor is a function of the size of the images, the number of the images on the screen, etc. The overlap of the images in FIG. 5C for creating the anchor 102 is merely representative: the anchor 102 may just as easily be created in FIG. 5B based on a different user-selectable separation distance.

Figure 6A:
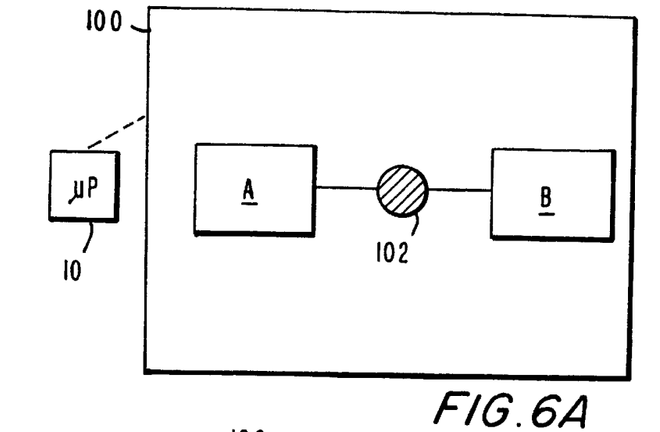
FIGS. 6A–6D show an exemplary operation of breaking up the group of images by eliminating the anchor 102 from the screen display 100.
Figure 6B:
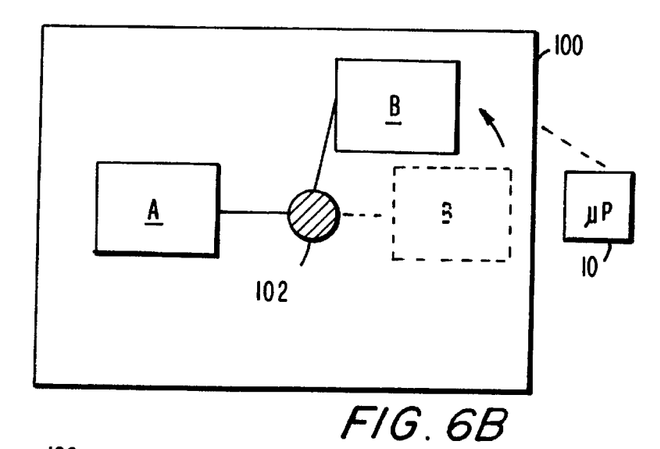
Figure 6C:
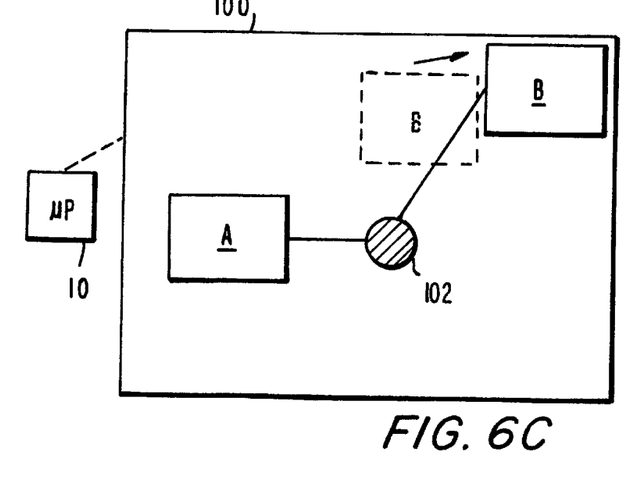
Figure 6D:
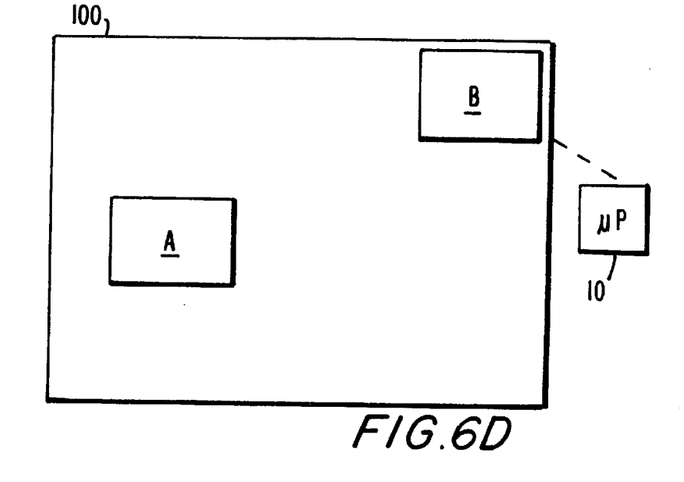

FIGS. 6A–6D illustrate the reverse operation of breaking up the group and eliminating the anchor from the screen display. Namely, FIG. 6A shows two images A. B in a group linked by the anchor 102. As the image B is dragged to its new position on the screen as shown in FIG. 5B, the group comprising the images A and B is still intact because the preselected separation distance has not been exceeded yet. Once, however, the link connecting the anchor 102 to the image B is extended to exceed the preselected separation distance as shown in FIG. 6C, the image B is removed from the group. Since in this representative example the group contained only two images A and B, the anchor 102 disappears from the display screen 100, thereby eliminating the group altogether, as shown in FIG. 6D. It is understood, of course, that if the group contained more than two images, the anchor 102 would remain on the screen, joining the remaining images, while the image B manipulated by the user would appear detached from the anchor 102, thereby separated from the group.

Figs. 1A, 1B, 2A–2C, 3, 5A–5D and 6A–6D show the screen display 100 under the control of microprocessor 10. It will be appreciated that the microprocessor 10 or any other programmable controller may be programmed to effect the operations of the present invention as described above with reference to those figures and in accordance with the functional diagram of FIG. 4.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A computer system for controlling via input means a screen display of a group of images represented by a graphical object, said group of images including a first image and a second image, said apparatus comprising:
   a screen for displaying said screen display; and
   a controllable processor programmed to select on the screen display said graphical object via said input means, and to manipulate said selected graphical object such that the screen display of said group of images is modified in correspondence with the manipulation of said selected graphical object, said processor being further programmed to disassociate said first image from said group and to remove said graphical object from said screen display when said first image is separated from said second image by a preselected distance on said screen display.

2. The computer system according to claim 1, wherein in response to the manipulation of said graphical object each respective image in said group is fully displayed according to a predetermined group configuration, said graphical object being connected to the images in said group via at least one fully displayed image.

3. The computer system according to claim 2, wherein in response to another manipulation of said graphical object each fully displayed image in said group is hidden from view on the screen display while said graphical object is displayed.

4. The computer system according to claim 1, wherein a menu is displayed on the screen display in response to the manipulation of said graphical object, said menu providing a plurality of items for performing a plurality of operations on said group of images collectively and on each respective image in said group individually.

5. The computer system according to claim 4, wherein one of said menu items includes removing said menu from the screen display.

6. The computer system according to claim 4, wherein one of said menu items includes fully displaying all of the images in said group according to a predetermined group configuration, said graphical object being connected to said group via at least one fully displayed image.

7. The computer system according to claim 6, wherein another of said menu items includes removing the fully displayed images from the screen display while said graphical object is displayed.

8. The computer system according to claim 6, wherein another of said menu items includes changing said predetermined group configuration of said fully displayed images on the screen display to another predetermined group configuration.

9. The computer system according to claim 6, wherein said processor is programmed to vary the size of each displayed image in said group based on a temporal order and is further programmed to sort said displayed images according to the size of each displayed image on the screen display.

10. The computer system according to claim 9, wherein said temporal order indicates an order in which each displayed image has been obtained by the computer system.

11. A computer system for controlling via input means a screen display of a first image and a second image, comprising:
    a screen for displaying said screen display; and
    a controllable processor programmed to generate a graphical object for connecting said first and second images when said first and second images are placed within a preselected distance of each other on said screen display such that a group comprising said first and second images is formed and such that said screen display of said group is selectively modified with the manipulation of said graphical object, said processor being further programmed to disassociate said first image from said group and to remove said graphical object from said screen display when said first image is separated from said second image by a preselected distance on said screen display.

12. The computer system according to claim 11, wherein said controllable processor is programmed to generate said graphical object when said first image partially overlaps said second image.

13. A method for controlling via input means a screen display of a group of images represented by a graphical object, said group of images including a first image and a second image, said method comprising the steps of:

selecting on the screen display said graphical object via said input means; and manipulating said selected graphical object such that the screen display of said group of images is modified in correspondence with the manipulation of said selected graphical object, said first image being disassociated from said group and said graphical object being removed from said screen display when said first image is separated from said second image by a preselected distance on said screen display.

14. The method according to claim 13, further comprising displaying a menu on the screen display in response to the manipulation of said graphical object, said menu providing a plurality of items for performing a plurality of operations on said group of images collectively and on each respective image in said group individually.

15. The method according to claim 14, wherein one of said menu items includes removing said menu from the screen display.

16. The method according to claim 14, wherein one of said menu items includes fully displaying all of the images in said group according to a predetermined group configuration, said graphical object being connected to said group via at least one fully displayed image.

17. The method according to claim 16, wherein another of said menu items includes removing the fully displayed images from the screen display while leaving said graphical object unmodified on the screen display.

18. The method according to claim 16, wherein another of said menu items includes changing the predetermined group configuration of said fully displayed images on the screen display to another predetermined group configuration.

19. The method according to claim 16, wherein the size of each displayed image in said group is varied based on a temporal order, and wherein said displayed images are sorted according to the size of each displayed image on the screen display.

20. The method according to claim 19, wherein said temporal order indicates an order in which each displayed image has been obtained by a computer system.

21. A method for controlling via input means a screen display of a first image and a second image, comprising the steps of:

placing via said input means said first image within a preselected distance from said second image on said screen display for forming a group comprising said first and second images; and generating a graphical object for connecting said first and second images when said first and second images are placed within a preselected distance of each other on said screen display such that a group comprising said first and second images is formed and such that said screen display of said group is selectively modified by manipulating said graphical object, and removing said graphical object from said screen display by disassociating said first image from said group when said first image is separated from said second image by a preselected distance on said screen display.

22. The method according to claim 21, wherein said graphical object is generated when said first image partially overlaps said second image.

* * * * *